United States Patent
Yun et al.

(10) Patent No.: US 12,491,702 B2
(45) Date of Patent: Dec. 9, 2025

(54) FLEXIBLE SMART WINDOW AND METHOD OF MANUFACTURING THE SAME

(71) Applicant: SK Innovation Co., Ltd., Seoul (KR)

(72) Inventors: Cheol Min Yun, Daejeon (KR); Hye Jin Park, Daejeon (KR)

(73) Assignee: SK Innovation Co., Ltd., Seoul (KR)

( * ) Notice: Subject to any disclaimer, the term of this patent is extended or adjusted under 35 U.S.C. 154(b) by 322 days.

(21) Appl. No.: 18/226,439

(22) Filed: Jul. 26, 2023

(65) Prior Publication Data
US 2024/0051266 A1 Feb. 15, 2024

(30) Foreign Application Priority Data
Aug. 8, 2022 (KR) ........................ 10-2022-0098685

(51) Int. Cl.
| B32B 15/08 | (2006.01) |
| B32B 7/12 | (2006.01) |
| B32B 15/04 | (2006.01) |
| B32B 37/18 | (2006.01) |

(52) U.S. Cl.
CPC ............... *B32B 15/08* (2013.01); *B32B 7/12* (2013.01); *B32B 15/043* (2013.01); *B32B 37/18* (2013.01); *B32B 2250/05* (2013.01); *B32B 2250/40* (2013.01); *B32B 2307/202* (2013.01); *B32B 2307/302* (2013.01); *B32B 2307/306* (2013.01); *B32B 2307/7376* (2023.05)

(58) Field of Classification Search
None
See application file for complete search history.

(56) References Cited

U.S. PATENT DOCUMENTS

| 2019/0134963 A1* | 5/2019 | Hara ...................... B32B 27/00 |
| 2020/0067020 A1* | 2/2020 | Byun ................. H10K 59/8731 |
| 2021/0335294 A1* | 10/2021 | Wang ................ G02F 1/134309 |

FOREIGN PATENT DOCUMENTS

| CN | 113253533 A | * | 8/2021 | ........... G02F 1/1525 |
| JP | H10500225 A | | 1/1998 | |
| JP | 2007148230 A | | 6/2007 | |
| KR | 1020110060336 A | | 6/2011 | |
| KR | 101888139 B1 | | 8/2018 | |

OTHER PUBLICATIONS

Xing—CN 113253533 A—MT—electrochromic multilayer—2021 (Year: 2021).*

* cited by examiner

*Primary Examiner* — John Vincent Lawler
(74) *Attorney, Agent, or Firm* — The Webb Law Firm (57) ABSTRACT

One embodiment provides a flexible smart window which includes an electrochromic structure including a discoloration layer, a first polyimide film disposed on the electrochromic structure, a second polyimide film disposed under the electrochromic structure, and a first adhesion promoting layer disposed on the first polyimide film and including at least one selected from the group consisting of a metal oxide, a metalloid oxide and an organic silane compound. Structural stability of the flexible smart window may be enhanced by improving an adhesive force between the polyimide film and the electrochromic structure in a high temperature process.

14 Claims, 9 Drawing Sheets

FLEXIBLE SMART WINDOW AND METHOD OF MANUFACTURING THE SAME

CROSS-REFERENCE TO RELATED APPLICATION

This application claims priority to Korean Patent Application No. 10-2022-0098685 filed on Aug. 8, 2022, the disclosure of which is hereby incorporated by reference in its entirety.

BACKGROUND

1. Field

The disclosure of the present application relates to a flexible smart window and a method of manufacturing the same.

2. Description of the Related Art

Among methods of manufacturing a flexible smart window, since a process using liquid crystal and a process using a suspended particle device (SPD) are applied with a lower process temperature than an electrochromic (EC) process, a method of manufacturing a flexible smart window by applying an optical film such as polyethylene terephthalate (PET) is widely known in the art. However, in the electrochromic technology, since a discoloration layer and an ion storage layer are subjected to treatment at high temperature of 400° C. or higher, there is a problem in that the PET or optical film applied to the conventional liquid crystal and SPD technology lacks heat resistance, thereby making it difficult to apply to the electrochromic technology.

In terms of the heat resistance, it may be considered to apply a polyimide film to a flexible smart window manufactured through the electrochromic technology. However, damage to the polyimide film may occur during a process of peeling-off a substrate layer or high-temperature treatment of the flexible smart window.

SUMMARY

According to an aspect of the present disclosure, there is provided a flexible smart window having improved structural stability and impact resistance.

According to an aspect of the present disclosure, there is provided a method of manufacturing a flexible smart window having improved structural stability and impact resistance.

In some embodiments, there is provided a flexible smart window including an electrochromic structure including a discoloration layer, a first polyimide film disposed on the electrochromic structure, a second polyimide film disposed under the electrochromic structure, and a first adhesion promoting layer disposed on the first polyimide film, the first adhesion promoting layer including at least one selected from the group consisting of a metal oxide, a metalloid oxide, an organic silane compound, and mixtures thereof.

In some embodiments, the metal oxide of the at least one adhesion promoting material may include at least one oxide selected from the group consisting of Al and Ti. In some embodiments, the metalloid oxide may include an oxide of Si.

In some embodiments, the flexible smart window may further include a second adhesion promoting layer which is disposed between the electrochromic structure and the first polyimide film and include a metal oxide or a metalloid oxide such as are disclosed herein.

In some embodiments, the flexible smart window may further include a third adhesion promoting layer which is disposed under the second polyimide film and includes at least one adhesion promoting material selected from the group consisting of the metal oxide, the metalloid oxide, the organic silane compound and mixtures thereof, such as are disclosed herein, wherein the at least one adhesion promoting material of the third adhesion promoting layer may be chemically the same or different from the adhesion promoting material of the first adhesion promoting layer.

In some embodiments, the flexible smart window may further includes a fourth adhesion promoting layer which is disposed between the electrochromic structure and the second polyimide film and include the metal oxide or the metalloid oxide, wherein the metal oxide or the metalloid oxide of the fourth adhesion promoting layer may be chemically the same or different from the metal oxide and/or the metalloid oxide of the second adhesion promoting layer.

In some embodiments, the first adhesion promoting layer may have a thickness of 30 nm to 70 nm.

In some embodiments, the electrochromic structure may further include a second conductive layer, an ion storage layer, an electrolyte layer, the discoloration layer, and a first conductive layer, which are sequentially disposed on the second polyimide film.

In some embodiments, the electrochromic structure may further include a second adhesion promoting layer which includes the metal oxide or the metalloid oxide, wherein the first adhesion promoting layer may be disposed between the first polyimide film and the first protective film, and the second adhesion promoting layer may be disposed between the second polyimide film and the second protective film.

In some embodiments, the first conductive layer and the second conductive layer respectively may include at least one conductive oxide selected from the group consisting of Indium Tin Oxide (ITO), Indium Oxide ($In_2O_3$), Indium Gallium Oxide (IGO), Fluor-doped Tin Oxide (FTO), Aluminum-doped Zinc Oxide (AZO), Gallium-doped Zinc Oxide (GZO), Antimony-doped Tin Oxide (ATO), Indium-doped Zinc Oxide (IZO), Niobium-doped Titanium Oxide (NTO), Zink Oxide (ZnO), Cesium Tungsten Oxide (CTO) and mixtures thereof.

In some embodiments, the ion storage layer may include an oxide or hydroxide of at least one of Ni, Co and Mn.

In some embodiments, the electrolyte layer may include at least one metal salt selected from the group consisting of metal salts of $H^+$, $Li^+$, $Na^+$, $K^+$, $Rb^+$, $Cs^+$ and mixtures thereof.

In some embodiments, the discoloration layer may include at least one selected from the group consisting of an oxide, a hydroxide, Prussian blue, and mixtures thereof. The oxide may include at least one oxide selected from the group consisting of Ti, Nb, Mo, Ta, W, Cr, Mn, Fe, Co, Ni, Rh, Ir, and mixtures thereof. The hydroxide may include at least one hydroxide selected from the group consisting of Cr, Mn, Fe, Co, Ni, Rh, Ir, and mixtures thereof.

In some embodiments, each of the first polyimide film and the second polyimide film may independently have a glass transition temperature of 450° C. or higher.

In some embodiments, the flexible smart window may further include a first protective film disposed on the first adhesion promoting layer, wherein the first adhesion promoting layer may be disposed between the first polyimide film and the first protective film.

A method of manufacturing a flexible smart window includes preparing a first multilayer structure by sequentially forming a first sacrificial layer, a first adhesion promoting layer, a first polyimide film, a first conductive layer, and a discoloration layer on a first carrier substrate, preparing a second multilayer structure by sequentially forming a second sacrificial layer, a second polyimide film, a second conductive layer, and an ion storage layer on a second carrier substrate, forming an electrolyte layer between the first multilayer structure and the second multilayer structure, and coupling the first multilayer structure and second multilayer structure so that the discoloration layer and the ion storage layer face each other, and separating the first carrier substrate from the first multilayer structure and separating the second carrier substrate from the second multilayer structure.

In some embodiments, the separating of the first carrier substrate and the second carrier substrate may include: separating the first carrier substrate from the first multilayer structure after irradiating the first sacrificial layer with a laser light through the first carrier substrate; and separating the second carrier substrate from the second multilayer structure after irradiating the second sacrificial layer with a laser light through the second carrier substrate.

In some embodiments, the forming of the first sacrificial layer on the first carrier substrate and the forming of the second sacrificial layer on the second carrier substrate may include: depositing silicon nitride (SiNx) and amorphous silicon on the first carrier substrate and the second carrier substrate, respectively; or depositing gallium nitride (GaN) on the first carrier substrate and the second carrier substrate, respectively, for example.

In some embodiments, the forming the first multilayer structure may include forming the first polyimide film by applying a polyamic acid composition to the first adhesion promoting layer, followed by performing heat treatment at 450° C. to 500° C. In some embodiments, forming the second multilayer structure may include forming the second polyimide film by applying a polyamic acid composition to the second sacrificial layer, followed by performing heat treatment at 450° C. to 500° C.

In some embodiments, forming the first multilayer structure may further include forming a second adhesion promoting layer between the first polyimide film and the first conductive layer.

In some embodiments, forming the second multilayer structure may further include forming a third adhesion promoting layer between the second sacrificial layer and the second polyimide film.

In some embodiments, forming the second multilayer structure may further include forming a fourth adhesion promoting layer between the second polyimide film and the second conductive layer.

According to some embodiments, polyimide films may be disposed on upper and lower surfaces of the electrochromic structure. Accordingly, a flexible smart window accompanied with a high temperature process of 450° C. or higher may be stably formed.

In some embodiments, the flexible smart window may include the adhesion promoting layer including a metal oxide and/or a metalloid oxide. Thereby, lifting and/or separation phenomena of the polyimide film and the electrochromic structure after the high temperature process may be prevented. Accordingly, damage and/or cracks of the polyimide film may be prevented.

DETAILED DESCRIPTION OF THE EMBODIMENTS

Hereinafter, embodiments of the present disclosure will be described in detail with reference to the accompanying drawings. However, the following drawings attached to the present specification illustrate embodiments of the present disclosure, and serve to further understand the technical spirit of the present disclosure together with the above-described contents of the disclosure, such that the present disclosure should not be construed as being limited only to the illustrations of the drawings.

Throughout the specification, unless explicitly described to the contrary, "including", "including" or "containing" any constituent elements will be understood to imply further inclusion of other constituent elements.

Unless the context clearly indicates otherwise, the singular forms of the terms used in the present specification may be interpreted as including the plural forms. As used herein, the singular form of "a", "an", and "the" include plural referents unless the context clearly states otherwise.

For the purposes of this specification, unless otherwise indicated, all numbers expressing quantities of ingredients, reaction conditions, dimensions, physical characteristics, and so forth used in the specification and claims are to be understood as being modified in all instances by the term "about." Hereinafter, unless otherwise defined herein, "about" may be considered as a value within 30%, 25%, 20%, 15%, 10%, 5%, 3%, 2%, 1%, 0.5%, 0.1%, 0.05% or 0.01 of the specified value. Unless indicated to the contrary, the numerical parameters set forth in the following specification and attached claims are approximations that can vary depending upon the desired properties sought to be obtained by the present disclosure.

Notwithstanding that the numerical ranges and parameters setting forth the broad scope of the disclosure are approximations, the numerical values set forth in the specific examples are reported as precisely as possible. Any numerical value, however, inherently contains certain errors necessarily resulting from the standard deviation found in their respective testing measurements.

Also, it should be understood that any numerical range recited herein is intended to include all sub-ranges subsumed therein. For example, a range of "1 to 10" is intended to include any and all sub-ranges between and including the recited minimum value of 1 and the recited maximum value of 10, that is, all subranges beginning with a minimum value equal to or greater than 1 and ending with a maximum value equal to or less than 10, and all subranges in between, e.g., 1 to 6.3, or 5.5 to 10, or 2.7 to 6.1.

In addition, the "upper" and "lower" described in the present specification are intended to describe the relative positional relationship of the respective components and do not mean an absolute position. Further, the "first," "second," "third" and "fourth" described in the present specification are intended to classify and describe a plurality of layers, and do not limit the order of manufacturing steps. However, it is to be understood that the disclosure can assume various alternative orientations and, accordingly, such terms are not to be considered as limiting. Also, it is to be understood that the disclosure can assume various alternative variations and sequences, except where expressly specified to the contrary. It is also to be understood that the specific smart windows and portions thereof, processes, and methods illustrated in the attached drawings, and described in the following specification, are examples. Hence, specific dimensions and other physical characteristics related to the embodiments disclosed herein are not to be considered as limiting.

Hereinafter, unless otherwise specifically defined in the present specification, when a part such as a layer, film, thin film, region, plate, etc. is placed "on" or "above" of another part, it may include not only embodiment(s) in which the part is placed "directly on" of the another part, but also embodiment(s) in which there is another part intervening therebetween. In addition, when a part such as a layer, film, thin film, region, plate, etc. is placed "under" or "below" of another part, it may include not only embodiment(s) in which the part is placed "directly under" of the another part, but also embodiment(s) in which there is another part intervening therebetween.

Hereinafter, unless otherwise specifically defined herein, the term "flexible" means that a flexible constituent may be warped, bent, and/or folded.

Hereinafter, unless otherwise specifically defined in the present specification, the "polymer" may include an oligomer or a polymer, as well as may include a homopolymer or a copolymer. The copolymer may include a random copolymer, a block copolymer, a graft copolymer, an alternating copolymer, a gradient copolymer, or any or all of the above-mentioned polymers. Hereinafter, unless otherwise defined in the present specification, a "mixture(s) thereof" or "combination(s) thereof" refers to mixing or copolymerization of constituents.

Unless otherwise specified in the present specification, "A and/or B" may mean an embodiment including both A and B, or may mean an embodiment selected one of A or B.

Hereinafter, unless otherwise specifically defined in the present specification, a "polyamic acid" may refer to a polymer including a structural unit including an amic acid moiety, and a "polyimide" may refer to a polymer including a structural unit including an imide moiety.

Some embodiments of the present disclosure provide a flexible smart window including an adhesion promoting layer. Also, there is provided a method of manufacturing the flexible smart window.

Figure 1:
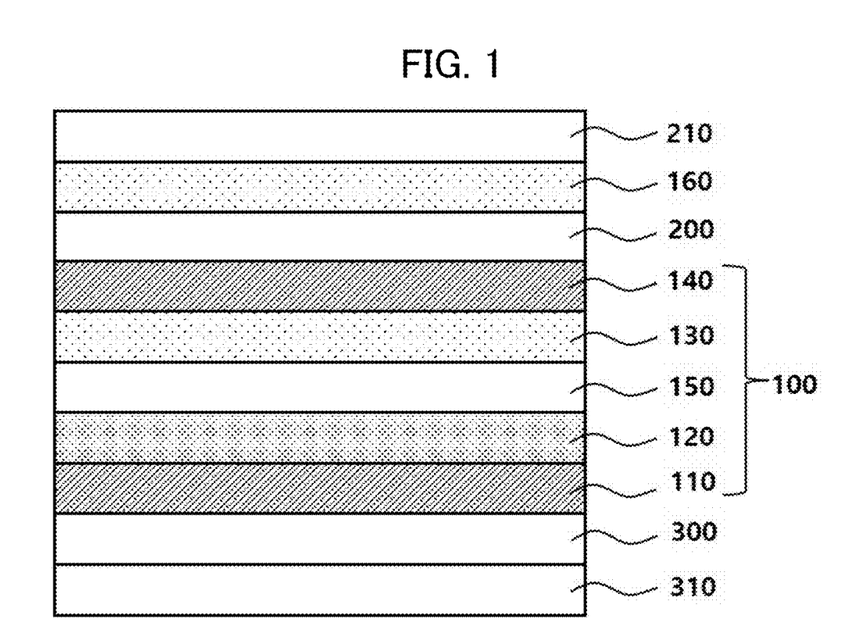
FIGS. 1 and 2 are schematic cross-sectional views, respectively, illustrating a flexible smart window according to example embodiments.
Figure 2:
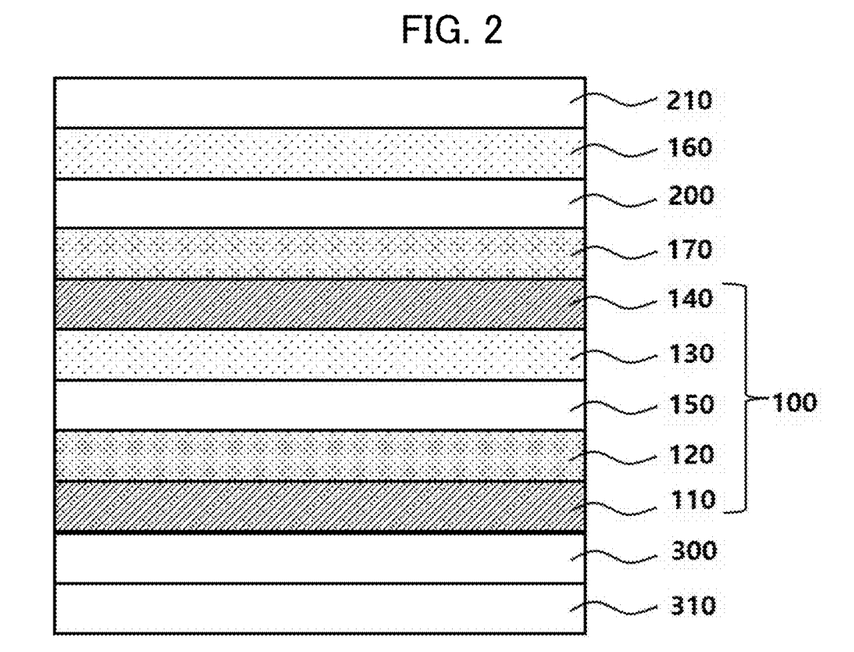

FIGS. 1 and 2 are schematic cross-sectional views illustrating a flexible smart window according to example embodiments, respectively.

Referring to FIGS. 1 and 2, the flexible smart window according to example embodiments may include an electrochromic structure 100 including a discoloration layer 130.

The electrochromic structure 100 may refer to an electrochromic device which exhibits reversible color changes as a current is supplied or cut off.

Each of a first polyamide film 200 and a second polyimide film 300 may independently have a glass transition temperature of about 450° C. or higher, respectively. When using polyethylene terephthalate (PET) having a glass transition temperature (Tg) of 150° C. or less as a substrate film of the flexible smart window, since the electrochromic structure 100 is subjected to treatment of the discoloration layer and an ion storage layer at a high temperature of 400° C. or higher, deformation and damage to the PET film may occur. On the other hand, the first polyamide film 200 and second polyimide film 300 may be stably applied to the electrochromic structure 100 accompanied by a high temperature process of 450° C. to 500° C. In addition, the electrochromic structure 100 prepared by the high temperature process has an excellent variable response speed when a current passes, such that improved electrochromic performance may be implemented.

In some embodiments, each of the first polyimide film 200 and second polyimide film 300 may independently have a thickness of 1 μm to 50 μm, 3 μm to 20 μm, or 5 μm to 10 μm. Since each of the first polyimide film 200 and the second polyimide film 300 have a thickness within the above thickness range, it is possible to implement the improved transparency and flexible properties while sufficiently protecting the electrochromic structure 100 from external impact and contamination.

For example, separation or lifting phenomenon may occur in the above-described polyimide films 200 and 300 and the electrochromic structure 100 during the high temperature process. For example, an adhesive force between the protective films 210 and 310 and the polyimide films 200 and 300 or between the polyimide films 200 and 300 and the electrochromic structure 100 is weakened at a high temperature, such that structural stability of the flexible smart window may be reduced.

According to some embodiments, the flexible smart window may include a first adhesion promoting layer 160 disposed on the first polyimide film 200.

In some embodiments, the first adhesion promoting layer 160 may include at least one adhesion promoting material selected from the group consisting of a metal oxide, a metalloid oxide, an organic silane compound and mixtures thereof. For example, the first adhesion promoting layer 160 may be an inorganic layer including a metal oxide and/or a metalloid oxide, and/or an organic layer including an organic silane compound. As the first adhesion promoting layer 160 is employed, the adhesive force between the first polyimide film 200 and the first protective film 210 to be described below may be improved, thereby preventing damage caused by the high temperature.

According to some embodiments, the metal oxide may include at least one oxide selected from the group consisting of Al and Ti, and the metalloid oxide may include an oxide of Si.

The organic silane compound may be, for example, a compound represented by Formula 1 below:

[Formula 1]

wherein in Formula 1, each Y is independently hydrogen or a hydrocarbon including a $C_1$-$C_6$ alkyl group, a $C_6$-$C_{12}$ aryl group, a $C_5$-$C_{12}$ cycloalkyl group, a $C_5$-$C_{12}$ cycloalkenyl group, a 5- to 7-membered heterocycloalkyl group, or a 5- to 7-membered heterocycloalkenyl group;

R is a hydrocarbon including a $C_1$-$C_6$ alkyl group, a $C_6$-$C_{12}$ aryl group, a $C_5$-$C_{12}$ cycloalkyl group, a $C_5$-$C_{12}$ cycloalkenyl group, a 5- to 7-membered heterocycloalkyl group, or a 5- to 7-membered heterocycloalkenyl group; and X includes at least one selected from the group consisting of an epoxy group, an amino group, a vinyl group, an isocyanate group, and a mercapto group.

In some embodiments, R and each Y in Formula 1 may each independently be substituted or unsubstituted hydrocarbons. For example, in some embodiments, at least one OY and/or R in Formula 1 may include a substituent.

For example, the substituent (if present) included in R and/or Y of Formula 1 may independently include at least one selected from the group consisting of halogen, a $C_1$-$C_6$ alkyl group, a $C_3$-$C_6$ cycloalkyl group, a $C_1$-$C_6$ alkoxy group, a 3- to 7-membered heterocycloalkyl group, a $C_6$-$C_{12}$ aryl group, a 5- to 7-membered heteroaryl group, a hydroxyl group (—OH), —$NR^4R^5$ (wherein $R^4$ and $R^5$ are each independently hydrogen or a $C_1$-$C_6$ alkyl group), a nitro group (—$NO_2$) and a cyano group (—CN).

According to some embodiments, the organic silane compound may include trimethoxysilane, and/or triethoxysilane and the like. These may be used alone or in combination thereof.

In some embodiments, as shown in FIG. 2, a second adhesion promoting layer 170 may be disposed between the electrochromic structure 100 and the first polyimide film 200. For example, the second adhesion promoting layer 170 may be an inorganic film including a metal oxide and/or a metalloid oxide. Accordingly, the second adhesion promoting layer 170 provides additional heat resistance, such that the adhesive force between the first polyimide film 200 and the electrochromic structure 100 may be maintained even after the high temperature process.

Figure 3:
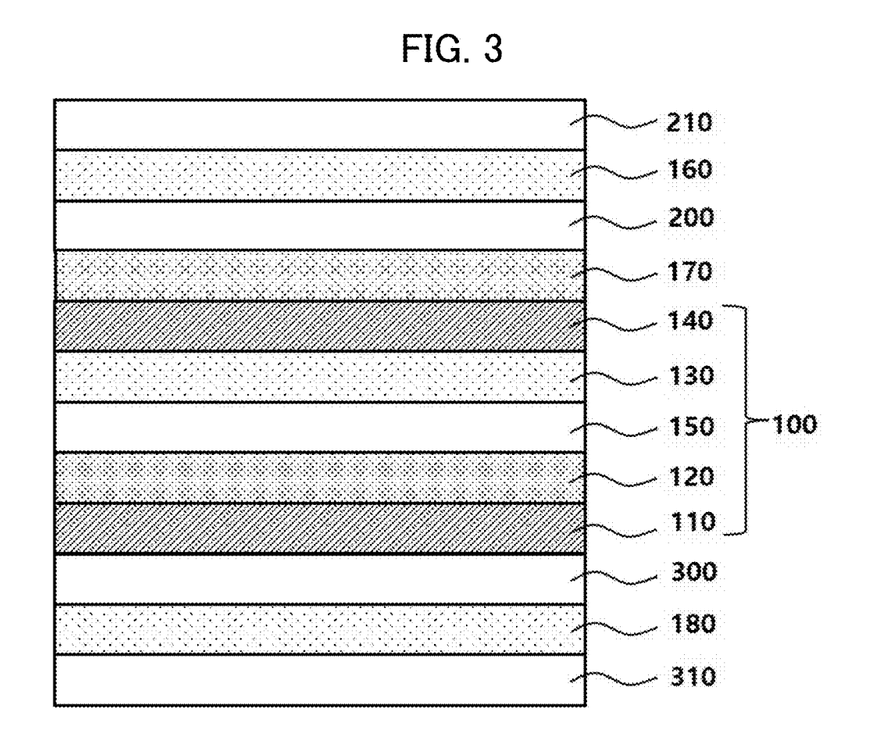
FIGS. 3 and 4 are schematic cross-sectional views, respectively, illustrating a flexible smart window according to example embodiments.
Figure 4:
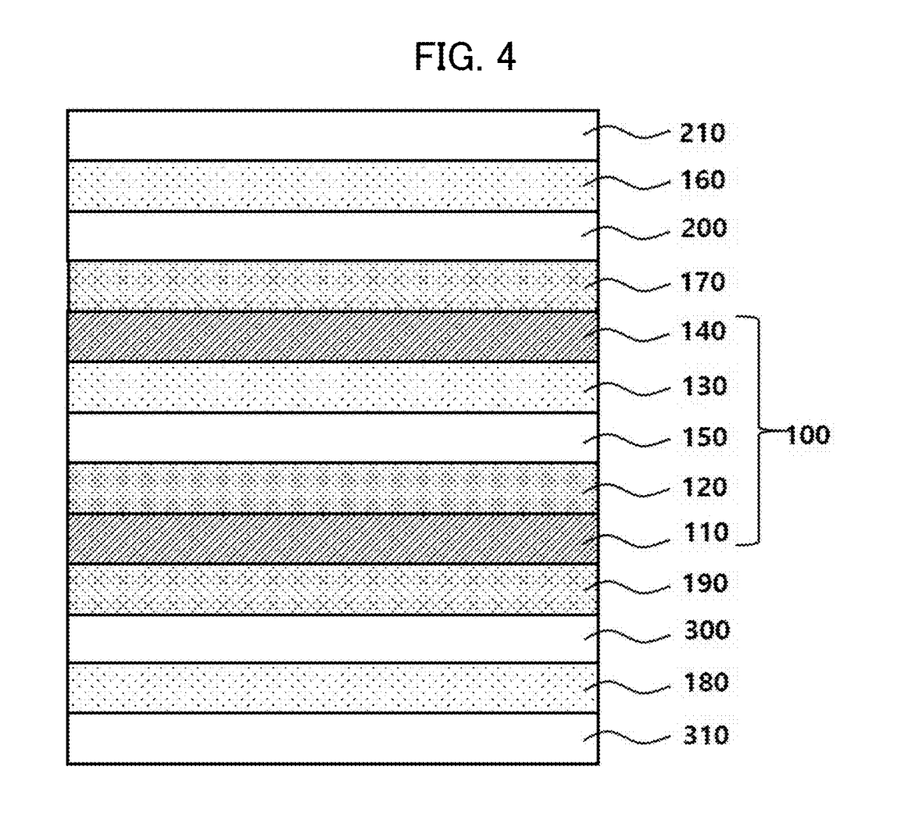

FIGS. 3 and 4 are schematic cross-sectional views illustrating a flexible smart window according to example embodiments, respectively.

Referring to FIGS. 3 and 4, in some embodiments, a third adhesion promoting layer 180 may be disposed under the second polyimide film 300. Through the arrangement of the third adhesion promoting layer 180, the adhesive force between the second polyimide film 300 and the second protective film 310 may be improved at a high temperature.

For example, the third adhesion promoting layer 180 may include one or more of the same type(s) of materials as the first adhesion promoting layer 160, wherein the at least one adhesion promoting material of the third adhesion promoting layer may be chemically the same or different from the first adhesion promoting layer.

According to some embodiments, as shown in FIG. 4, a fourth adhesion promoting layer 190 may be further included between the second polyimide film 300 and the electrochromic structure 100. Accordingly, heat resistance and stability may be further secured.

For example, the fourth adhesion promoting layer 190 may include one or more of the same type of metal oxide and/or metalloid oxide as the second adhesion promoting layer 170.

Through the arrangement of the above-described adhesion promoting layers, lifting and separation phenomena between the polyimide films 200 and/or 300 and the electrochromic structure 100 may be prevented after the high temperature process. Accordingly, damage or cracks of the polyimide films 200 and/or 300 may be prevented.

In some embodiments, the first adhesion promoting layer 160 may have a thickness of 30 nm to 70 nm, or 35 nm to 50 nm. Within the above thickness range, a decrease in the transmittance of the flexible smart window may be prevented while improving the adhesive force between the polyimide films 200 and/or 300 and the electrochromic structure 100. Within the above thickness range, an occurrence of damage and/or cracks of the adhesion promoting layers 160, 170, 180, and 190 in the high temperature process may be prevented.

According to some embodiments, the electrochromic structure 100 may be formed by sequentially disposing a second conductive layer 110, the ion storage layer 120, an electrolyte layer 150, the discoloration layer 130, and a first conductive layer 140 on the second polyimide film 300.

In some embodiments, each of the first conductive layer 140 and the second conductive layer 110 may include an independently selected conductive oxide. The conductive oxide may be, for example, at least one selected from the group consisting of Indium Tin Oxide (ITO), Indium Oxide ($In_2O_3$), Indium Gallium Oxide (IGO), Fluor-doped Tin Oxide (FTO), Aluminum-doped Zinc Oxide (AZO), Gallium-doped Zinc Oxide (GZO), Antimony-doped Tin Oxide (ATO), Indium-doped Zinc Oxide (IZO), Niobium-doped Titanium Oxide (NTO), Zink Oxide (ZnO), Cesium Tungsten Oxide (CTO), and mixtures thereof. Accordingly, the conductive layers 140 and 110 having improved transparency and electrical conductivity may be provided.

According to one embodiment, the first conductive layer 140 and the second conductive layer 110 may include ITO, respectively.

For example, each of the first conductive layer 140 and the second conductive layer 110 may have a thickness of 20 nm to 400 nm, 50 nm to 350 nm, or 100 nm to 300 nm. Within the above thickness range, an excessive increase in the thickness of the flexible smart window may be suppressed while implementing a flexible smart window having improved conductivity and transmittance.

In some embodiments, the ion storage layer 120 may store and provide electrolyte ions to be used in an electrochromic reaction. For example, the ion storage layer 120 may include at least one oxide and/or hydroxide selected from the group consisting of Ni, Co and/or Mn.

For example, the ion storage layer 120 may have a thickness of 50 nm to 500 nm, 80 nm to 450 nm, or 100 nm to 250 nm. Within the above thickness range, a charge balance with the discoloration layer 130 may be maintained while containing a sufficient amount of the electrolyte ions.

In some embodiments, the discoloration layer 130 may be a layer which exhibits reversible color changes by a discoloration material when the current is supplied.

The discoloration material may include, for example, at least one selected from the group consisting of a reductive discoloration material and/or an oxidative discoloration material.

For example, the reductive discoloration material may be at least one oxide selected from the group consisting of Ti, Nb, Mo, Ta and W.

The oxidative discoloration material may be at least one selected from the group consisting of an oxide, a hydroxide and Prussian blue. The oxide may include at least one oxide selected from the group consisting of Cr, Mn, Fe, Co, Ni, Rh, Jr, and mixtures thereof. The hydroxide may include at least one hydroxide selected from the group consisting of Cr, Mn, Fe, Co, Ni, Rh, Jr, and mixtures thereof.

For example, the discoloration layer 130 may have a thickness of 20 nm to 400 nm, specifically 30 nm to 350 nm, and more specifically 50 nm to 100 nm. Within the above thickness range, an excessive increase in the thickness of the flexible smart window may be suppressed while including a sufficient amount of the discoloration material.

In some embodiments, the electrolyte layer 150 may provide electrolyte ions involved in the electrochromic reaction to the discoloration layer 130. For example, the electrolyte layer 150 may be provided as a passage through which the electrolyte ions of the ion storage layer 120 are transferred to the discoloration layer 130. For example, the electrolyte layer 150 may include at least one selected from the group consisting of a liquid electrolyte, a gel polymer electrolyte, or an inorganic solid electrolyte.

For example, the electrolyte layer 150 may include a metal salt and a solvent.

The metal salt may include, for example, at least one selected from the group consisting of, $H^+$, $Li^+$, $Na^+$, $K^+$, $Rb^+$, and $Cs^+$. For example, the electrolyte layer 150 may include a lithium salt compound such as $LiClO_4$, $LiBF_4$, $LiAsF_6$, or $LiPF_6$, or a sodium salt compound such as $NaClO_4$.

The electrolyte layer 150 may include a carbonate compound having a high dielectric constant as the solvent. Accordingly, ionic conductivity of the electrolyte layer 150 may be improved. For example, the carbonate compound may include a linear carbonate compound, a cyclic carbonate compound, or a combination thereof, or may include at least one carbonate compound selected from the group consisting of propylene carbonate (PC), ethylene carbonate (EC), dimethyl carbonate (DMC), diethyl carbonate (DEC) and ethylmethyl carbonate (EMC).

In some embodiments, adhesive layers (not shown) may be formed on the first polyimide film 200 and under the second polyimide film 300, respectively.

Each of the first adhesive layer and the second adhesive layer may have a light transmittance of 10% or less in a wavelength region of 10 nm to 395 nm. Within the light transmittance range, ultraviolet rays are sufficiently absorbed by the adhesive layer, such that a deterioration in the electrochromic performance may be suppressed even when exposed to sunlight for a long period of time.

According to one embodiment, the adhesive layer may have a visible light transmittance of 90% or more. Accordingly, overall transmittance of the flexible smart window may be enhanced, thereby improving the transparency.

For example, each of the adhesive layers may include an optically clear adhesive (OCA), an optically clear resin (OCR) or the like.

In some embodiments, through the adhesive layers, the first adhesion promoting layer 160 and the first protective film 210 may be coupled, and the third adhesion promoting layer 180 and the second protective film 310 may be coupled. Accordingly, light resistance may be improved by the adhesive layers while protecting the flexible smart window from the external impact.

For example, the protective films 210 and 310 may include glass.

In some embodiments, the first adhesion promoting layer 160 may be disposed between the first polyimide film 200 and the first protective film 210. Accordingly, damage to the first polyimide film 200 and the first protective film 210 at a high temperature may be prevented.

According to one embodiment, the third adhesion promoting layer 180 may be disposed between the second polyimide film 300 and the second protective film 310. Thereby, damage to the second polyimide film 300 and the second protective film 310 at a high temperature may be prevented.

In some embodiments, the second adhesion promoting layer 170 may be disposed between the first polyimide film 200 and the first conductive layer 140. Thereby, the adhesive force between the first polyimide film 200 and the first conductive layer 140 may be improved. Accordingly, it is possible to further prevent the first polyimide film 200 and the first conductive layer 140 from being separated or damaged in the high temperature process.

According to one embodiment, the fourth adhesion promoting layer 190 may be disposed between the second polyimide film 300 and the second conductive layer 110. Accordingly, it is possible to further prevent the second polyimide film 300 and the second conductive layer 110 from being separated or damaged in the high temperature process.

Figure 5:
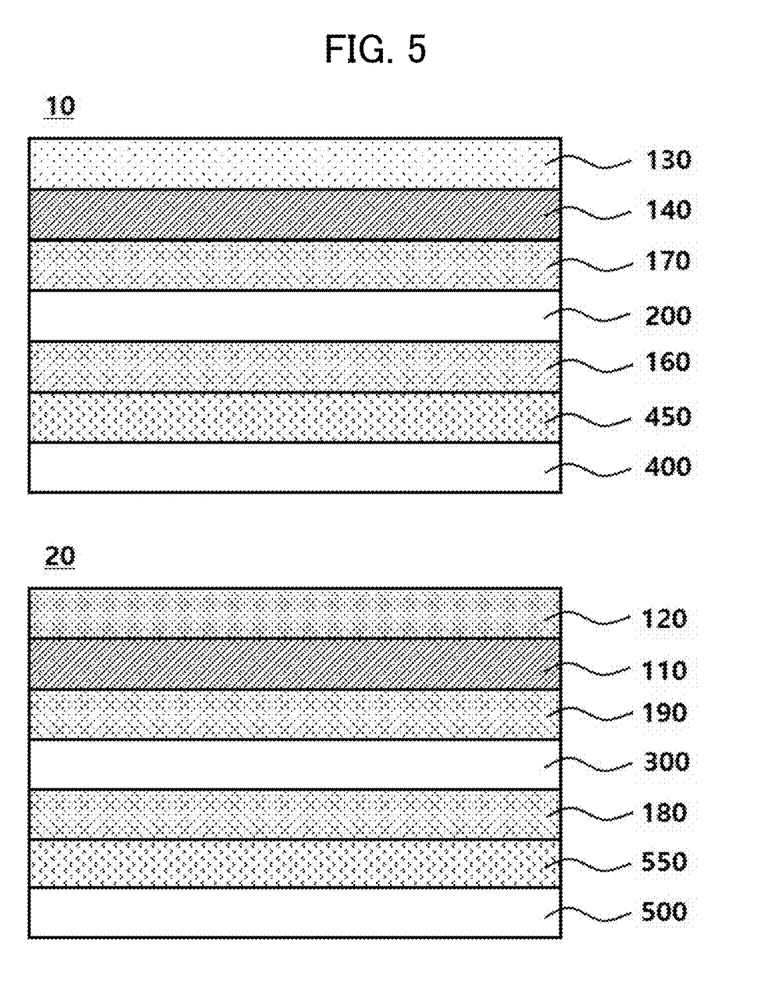
FIGS. 5 to 7 are schematic cross-sectional views, respectively, illustrating a method of manufacturing a flexible smart window according to example embodiments.
Figure 6:
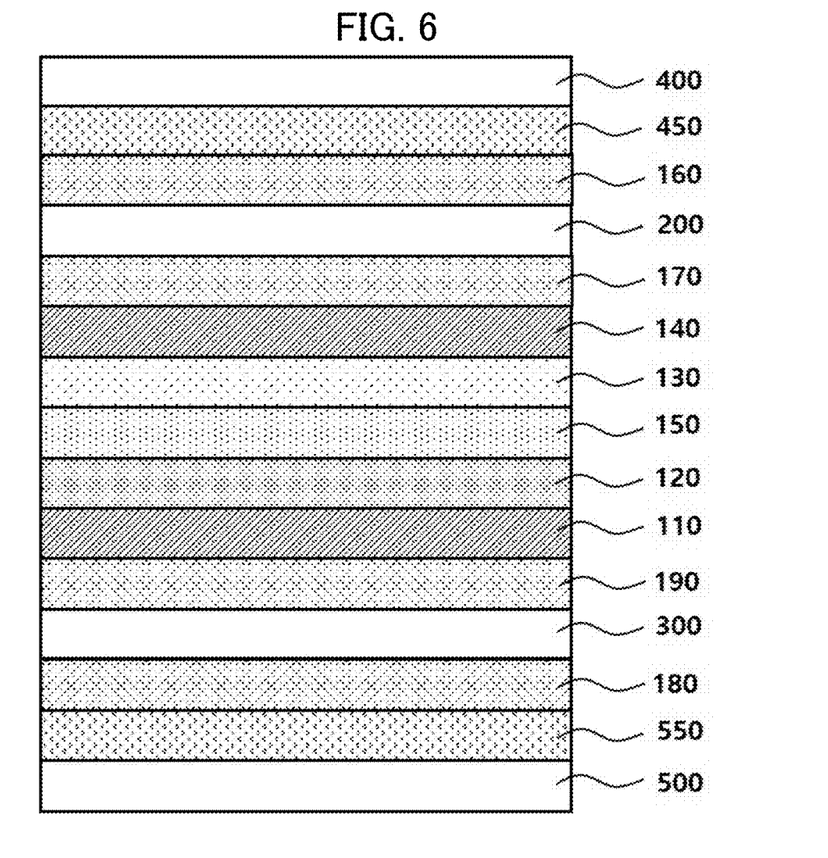
Figure 7:
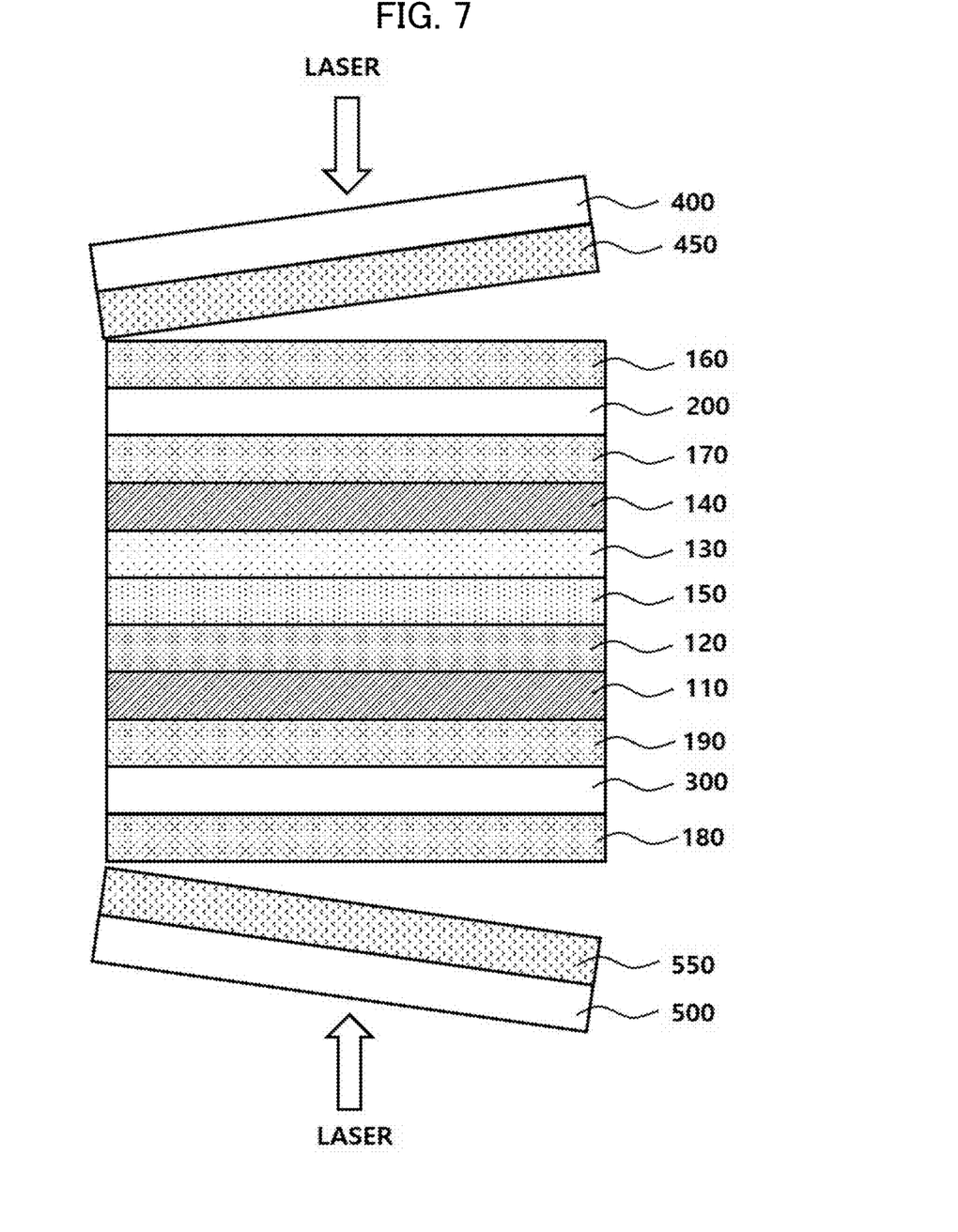

FIGS. 5 to 7 are schematic cross-sectional views illustrating a method of manufacturing a flexible smart window according to example embodiments, respectively.

Hereinafter, the method of manufacturing the above-described flexible smart window will be described with reference to FIGS. 5 to 7.

Referring to FIG. 5, a first multilayer structure 10 may be prepared by sequentially forming the first adhesion promoting layer 160, the first polyimide film 200, the first conductive layer 140, and the discoloration layer 130 on a first carrier substrate 400.

For example, a first sacrificial layer 450 may be formed between the first carrier substrate 400 and the first adhesion promoting layer 160. The first sacrificial layer 450 may be formed by depositing at least one selected from the group consisting of silicon nitride (SiNx), amorphous silicon (a-Si), and gallium nitride (GaN) on the first carrier substrate 400.

For example, the first sacrificial layer 450 may be formed by depositing silicon nitride and amorphous silicon on the first carrier substrate 400, or depositing gallium nitride on the first carrier substrate 400.

In some embodiments, the first adhesion promoting layer 160 may be formed by depositing at least one adhesion promoting material selected from the group consisting of a metal oxide, a metalloid oxide, an organic silane compound, and mixtures thereof, on the first carrier substrate 400 or the first sacrificial layer 450.

For example, at least one adhesion promoting material selected from the group consisting of a metal oxide, a metalloid oxide, an organic silane compound, and mixtures thereof, may be deposed on the first carrier substrate 400 or the first sacrificial layer 450 by selecting a method such as chemical vapor deposition (CVD), plasma-enhanced chemical vapor deposition (PECVD), physical vapor deposition (PVD), sputtering or the like.

In some embodiments, the first polyimide film 200 may be formed by applying a polyamic acid composition on the first adhesion promoting layer 160, followed by performing heat treatment at 450° C. to 500° C. Within the above temperature range, transmittance and heat resistance of the first polyimide film 200 may be improved.

For example, the first conductive layer 140 may be formed by depositing the above-described conductive oxide on the first polyimide film 200.

According to some embodiments, the second adhesion promoting layer 170 may be further formed between the first polyimide film 200 and the first conductive layer 140. For example, the second adhesion promoting layer 170 may be formed by depositing the metal oxide and/or metalloid oxide on the first polyimide film 200.

For example, the discoloration layer 130 may be formed by applying a coating composition including the above-described discoloration material, a solvent, and a silane compound to the first conductive layer 140, followed by calcining the same at 450° C. to 500° C. For example, the solvent, such as alcohol, may be removed at a temperature of 450° C. or higher, and the discoloration layer 130 having a solid phase may be formed through condensation and hydrolysis reactions of the silane compound. For example, the calcination may be performed for 1 minute to 200 minutes.

In some embodiments, a second multilayer structure 20 may be prepared by sequentially forming the second polyimide film 300, the second conductive layer 110, and the ion storage layer 120 on a second carrier substrate 500.

In some embodiments, at least one of the first multilayer structure 10 and the second multilayer structure 20 may include the adhesion promoting layers 160 and 170.

According to some embodiments, a multilayer structure of the first multilayer structure and the second multilayer structure 20, which is prepared through a high temperature process of 460° C. or higher, may include the adhesion promoting layer.

According to one embodiment, the multilayer structure prepared through the high temperature process of 460° C. or higher may be the first multilayer structure 10. In this case, the first multilayer structure 10 may include the first adhesion promoting layer 160.

For example, a second sacrificial layer 550 may be formed between the second carrier substrate 500 and the second polyimide film 300. The second sacrificial layer 550 may be formed by depositing at least one selected from the group consisting of silicon nitride (SiNx), amorphous silicon (a-Si), gallium nitride (GaN), and mixtures thereof, on the second carrier substrate 500.

For example, the second sacrificial layer 550 may be formed by depositing silicon nitride and amorphous silicon on the second carrier substrate 500, or depositing gallium nitride on the second carrier substrate 500.

According to some embodiments, the third adhesion promoting layer 180 may be formed between the second sacrificial layer 550 and the second polyimide film 300. For example, the third adhesion promoting layer 180 may be formed on the second carrier substrate 500 or the second sacrificial layer 550 in the same method as the first adhesion promoting layer 160.

In some embodiments, the second polyimide film 300 may be formed by applying a polyamic acid composition on the second sacrificial layer 550 or the third adhesion promoting layer 180, followed by performing heat treatment at 450° C. to 500° C. Within the above temperature range, transmittance and heat resistance of the second polyimide film 300 may be improved.

According to one embodiment, the heat treatment temperature for forming the first polyimide film 200 and the heat treatment temperature for forming the second polyimide film 300 may be the same as each other.

According to one embodiment, the heat treatment temperature for forming the first polyimide film 200 and the heat treatment temperature for forming the second polyimide film 300 may be different from each other.

For example, the second conductive layer 110 may be formed by depositing the above-described conductive oxide on the second polyimide film 300.

According to some embodiments, the fourth adhesion promoting layer 190 may be further formed between the second polyimide film 300 and the second conductive layer 110. For example, the fourth adhesion promoting layer 190 may be formed by depositing the above-described metal oxide and/or metalloid oxide on the second polyimide film 300.

For example, the ion storage layer 120 may be formed by applying a coating composition including one or more oxides or hydroxides selected from Ni, Co and/or Mn, a solvent, and a silane compound to the second conductive layer 110, followed by calcining the same at 450° C. to 500° C. For example, the solvent, such as alcohol, may be removed at a temperature of 450° C. or higher, and the solid ion storage layer 120 may be formed through the condensation and hydrolysis reactions of the silane compound. For example, the calcination may be performed for 1 minute to 200 minutes.

According to one embodiment, the calcination temperature for forming the discoloration layer 130 and the calcination temperature for forming the ion storage layer 120 may be the same as each other. Thereby, the convenience of process may be improved and costs may be reduced.

According to one embodiment, the calcination temperature for forming the discoloration layer 130 and the calcination temperature for forming the ion storage layer 120 may be different from each other. For example, the calcination temperature for forming the discoloration layer may be higher than the calcination temperature for forming the ion storage layer. In this case, driving reliability and durability during repeated discoloration of the electrochromic structure may be improved.

As described above, the formation of the ion storage layer 120 and the discoloration layer 130 may be performed at 450° C. or higher. Therefore, a flexible smart window having improved electrochromic performance may be manufactured by adopting the polyimide films 200 and 300 having a glass transition temperature of 450° C. or higher with high heat resistance instead of the conventional glass material or PET.

For example, the first multilayer structure 10 may be provided as an anode of the electrochromic structure 100 and the second multilayer structure 20 may be provided as a cathode of the electrochromic structure 100. Accordingly, as a power is applied or not applied to the first conductive layer 140 and the second conductive layer 110, electrolyte ions (e.g., Lit) may move from the ion storage layer 120 to the discoloration layer 130. Accordingly, coloration and discoloration (i.e., reversible color changes) of the flexible smart window may be implemented.

Referring to FIG. 6, the above-described first multilayer structure 10 and second multilayer structure 20 may be coupled so that the ion storage layer 120 and the discoloration layer 130 face each other.

In some embodiments, an electrolyte layer 150 may be formed between the ion storage layer 120 and the discoloration layer 130.

Referring to FIG. 7, the first carrier substrate 400 and the first sacrificial layer 450 may be separated from the first polyimide film 200 through a laser lift-off process. Similarly, the second carrier substrate 500 and the second sacrificial layer 550 may be separated from the second polyimide film 300 through the laser lift-off process.

The term "laser lift-off process" as used herein may refer to a process of separating the carrier substrate by irradiating it with a laser light.

For example, the first carrier substrate 400 and the first sacrificial layer 450 may be separated from the first polyimide film 200 by irradiating the first sacrificial layer 450 with a laser light through the first carrier substrate 400.

For example, the second carrier substrate 500 and the second sacrificial layer 550 may be separated from the second polyimide film 300 by irradiating the second sacrificial layer 550 with a laser light through the second carrier substrate 500.

The laser light may be a light in a wavelength region of 190 nm to 343 nm.

For example, the laser light may pass through the carrier substrates 400 and 500 and be absorbed by the sacrificial layers 450 and 550. Accordingly, as the sacrificial layers 450 and 550 are carbonized, the adhesive force with the polyimide films 200 and 300 is reduced, such that the carrier substrates 400 and 500 and the sacrificial layers 450 and 550 may be separated from the polyimide films 200 and 300. For example, the sacrificial layers 450 and 550 may buffer attraction and tension applied to the polyimide films 200 and 300 during the laser lift-off process.

Hereinafter, examples are proposed to facilitate understanding of the present disclosures. However, the following examples are only given for illustrating the present disclosure and those skilled in the art will obviously understand that various alterations and modifications are possible within the scope and spirit of the present disclosure.

Example 1

Non-alkali glass having a thickness of 0.5 mm was prepared as a first carrier substrate and a second carrier substrate.

A SiN layer was deposited on the first carrier substrate and the second carrier substrate to a thickness of 5 μm at 1 Torr using a PECVD method at a temperature of 350° C. by flowing gases of $SiH_4$ at 15 sccm, $NH_3$ at 300 sccm, and $PN_2$ at 800 sccm. A first sacrificial layer and a second sacrificial layer were formed by applying the same method to an upper portion of the deposited SiN layer and depositing an amorphous silicon layer to a thickness of 5 μm at 1 Torr by flowing $SiH_4$ and $H_2$ gases under the same temperature condition.

A first adhesion promoting layer was formed by depositing $SiO_2$ on the first sacrificial layer to a thickness of 40 nm.

Specifically, a $SiO_2$ oxide film was prepared using HDP-CVD (Atech system Co., EL-PECVD Lab-100) equipment. For high-density plasma formation of the equipment used, a 3 kW class transformer coupled plasma (TCP) source was used. A $SiO_2$ thin film was deposited using $SiH_4$ and $N_2O$ gases by the PECVD method.

$SiO_2$ was deposited on the first sacrificial layer, wherein gas flow rates of $SiH_4$ and $N_2O$ were 5 sccm and 90 sccm, respectively.

350 W of RF voltage at 13.56 MHz was applied to the top of a chamber for forming plasma, wherein the process pressure was fixed at 350 mTorr, and the deposition temperature was fixed at 300° C.

In a flask, 0.218 mol of 9,9'-bis(3,4-dicaroxyphenyl) fluorene dianhydride (BPAF) and 1.397 mol of pyromellitic dianhydride (PMDA) were input into a solution in which 1.623 mol of 2,2'-bis(trifluoromethyl)benzidine (TFMB) and 8,324 g of Dimethylacetamide (DMAc) were mixed, followed by performing polymerization at room temperature (25° C.) for 3 days to obtain a polyamic acid solution.

The obtained polyamic acid solution was applied to the first adhesion promoting layer and the second sacrificial layer under a nitrogen atmosphere, respectively. Then, the applied mixed solution was heated at an oxygen concentration of 100 LPM or less at a rate of 5° C./min, followed by performing heat treatment at 80° C. for 30 minutes and at 460° C. for 40 minutes, thus to form a first polyimide film and a second polyimide film to have a thickness of 4 μm, respectively.

A first conductive layer and a second conductive layer were formed by depositing ITO on the first polyimide film and the second polyimide film to a thickness of 230 nm at 350° C., respectively.

The above-described coating composition for a discoloration layer was applied to the first conductive layer, followed by performing heat treatment at 550° C. to form a first multilayer structure on which the discoloration layer was formed.

The above-described coating composition for an ion storage layer was applied to the second conductive layer, followed by performing heat treatment at 480° C. to form a second multilayer structure on which the ion storage layer was formed.

The first multilayer structure and the second multilayer structure were laminated so that the discoloration layer and the ion storage layer faced each other, then an electrolyte solution was injected between the discoloration layer and the ion storage layer, and sealed with a sealant.

At this time, a material, in which $LiPF_6$ was dissolved in a mixed solvent of EC/EMC/DEC (25/45/30; volume ratio) to have a concentration of 1 M and then vinylene carbonate (VC) was added, was used as the electrolyte.

Thereafter, the first sacrificial layer was irradiated with a laser light to separate the first carrier substrate and the first sacrificial layer from the first adhesion promoting layer, and an adhesive layer and a first protective film were formed on the first adhesion promoting layer.

In addition, the second carrier substrate and the second sacrificial layer were also peeled-off from the second polyimide film in the same method, and then an adhesive layer and a second protective film were formed on the second polyimide film to manufacture a flexible smart window.

At this time, the adhesive layer was an optically clear adhesive (OCA) film, and the first protective film and the second protective film were glass.

Example 2

A flexible smart window was manufactured according to the same procedures as described in Example 1, except that the first adhesion promoting layer was formed to have a thickness of 50 nm.

Example 3

A flexible smart window was manufactured according to the same procedures as described in Example 1, except that the first adhesion promoting layer was formed by forming $Al_2O_3$ to a thickness of 50 nm, respectively, instead of $SiO_2$.

Example 4

A flexible smart window was manufactured according to the same procedures as described in Example 1, except that the first adhesion promoting layer was formed by forming $TiO_2$ to a thickness of 40 nm, respectively, instead of $SiO_2$.

Example 5

A flexible smart window was manufactured according to the same procedures as described in Example 1, except that the first adhesion promoting layer was formed to have a thickness of 35 nm.

Example 6

A flexible smart window was manufactured according to the same procedures as described in Example 1, except that the first adhesion promoting layer was formed to have a thickness of 25 nm.

Example 7

A flexible smart window was manufactured according to the same procedures as described in Example 1, except that the first adhesion promoting layer was formed to have a thickness of 65 nm.

Example 8

A flexible smart window was manufactured according to the same procedures as described in Example 1, except that the first adhesion promoting layer was formed to have a thickness of 73 nm.

Example 9

A flexible smart window was manufactured according to the same procedures as described in Example 1, except that a second adhesion promoting layer was formed between the first polyimide film and the first conductive layer in the same manner as the formation of the first adhesion promoting layer.

Example 10

A flexible smart window was manufactured according to the same procedures as described in Example 1, except that a third adhesion promoting layer was formed between the second sacrificial layer and the second polyimide film in the same manner as the formation of the first adhesion promoting layer.

Example 11

A flexible smart window was manufactured according to the same procedures as described in Example 9, except that a third adhesion promoting layer was formed between the second sacrificial layer and the second polyimide film in the same manner as the formation of the first adhesion promoting layer.

Example 12

A flexible smart window was manufactured according to the same procedures as described in Example 11, except that a fourth adhesion promoting layer was formed between the second polyimide film and the second conductive layer in the same manner as the formation of the first adhesion promoting layer.

Comparative Example 1

A flexible smart window was manufactured according to the same procedures as described in Example 1, except that the adhesion promoting layer was not formed.

Comparative Example 2

A flexible smart window was manufactured according to the same procedures as described in Example 1, except that the first adhesion promoting layer was formed by forming SiN to a thickness of 40 nm, respectively, instead of $SiO_2$.

Experimental Example

1) Evaluation of Adhesive Force

The flexible smart windows according to the above-described examples and comparative examples were left in a thermo-hygrostat chamber under conditions of 60° C. and 85% relative humidity for 24 hours. Thereafter, the entire flexible smart window was equally divided into 100 regions in a planar direction, and the number (x) of regions where peeling-off or lifting occurred was counted and expressed as x/100.

2) Evaluation of Film Lifting after Forming the First Conductive Layer and the Second Conductive Layer After performing the processes of forming the first conductive layer and the second conductive layer according to the above-described examples and comparative examples, the presence or absence of film lifting of the polyimide film on the carrier substrate was visually measured and evaluated as follows.

○: Uniform coating state was maintained without lifting
X: Performing subsequent process was impossible due to lifting 3) Evaluation of Damage to ITO Inorganic Film After performing the processes of forming the first conductive layer and the second conductive layer according to the above-described examples and comparative examples, a degree of damage/cracks to the ITO inorganic film was visually observed and evaluated as follows.

○: No damage/cracks observed
Δ: Damage/cracks were locally observed
X: Damage/cracks were partially or entirely observed and commercialization was impossible Materials of the adhesion promoting layer, thicknesses of the adhesion promoting layer, evaluation results of the adhesive force, possibility of application of an LLO process, and evaluation results of damage were shown in Table 1 below.

TABLE 1

| Item | First adhesion promoting layer Material | First adhesion promoting layer Thickness (nm) | The number adhesion promoting layers | Evaluation of adhesive force | Presence or absence of film lifting | Degree of damage to ITO inorganic film |
|---|---|---|---|---|---|---|
| Example 1 | $SiO_2$ | 40 | 1 | 2/100 | ○ | ○ |
| Example 2 | $SiO_2$ | 50 | 1 | 3/100 | ○ | ○ |
| Example 3 | $Al_2O_3$ | 50 | 1 | 4/100 | ○ | ○ |
| Example 4 | $TiO_2$ | 40 | 1 | 1/100 | ○ | ○ |
| Example 5 | $SiO_2$ | 35 | 1 | 3/100 | ○ | ○ |

TABLE 1-continued

| Item | First adhesion promoting layer Material | First adhesion promoting layer Thickness (nm) | The number adhesion promoting layers | Evaluation of adhesive force | Presence or absence of film lifting | Degree of damage to ITO inorganic film |
|---|---|---|---|---|---|---|
| Example 6 | SiO$_2$ | 25 | 1 | 3/100 | ○ | Δ |
| Example 7 | SiO$_2$ | 65 | 1 | 2/100 | ○ | ○ |
| Example 8 | SiO$_2$ | 73 | 1 | 6/100 | ○ | Δ |
| Example 9 | SiO$_2$ | 40 | 2 | 0/100 | ○ | ○ |
| Example 10 | SiO$_2$ | 40 | 2 | 0/100 | ○ | ○ |
| Example 11 | SiO$_2$ | 40 | 3 | 0/100 | ○ | ○ |
| Example 12 | SiO$_2$ | 40 | 4 | 0/100 | ○ | ○ |
| Comparative Example 1 | — | — | 0 | 32/100 | X | X |
| Comparative Example 2 | SiN | 40 | 1 | 34/100 | X | X |

Referring to Table 1, in the examples to which the adhesion promoting layer including a metal oxide or metalloid oxide was applied, peeling-off and damage to the polyimide film were suppressed in the high temperature process (e.g., LLO process) compared to the comparative examples. Accordingly, flexible smart windows having improved heat resistance and process efficiency were implemented.

In Example 6, since the thickness of the adhesion promoting layer was relatively thin compared to other examples, the polyimide film was partially damaged in the high temperature process.

In Example 8, since the thickness of the adhesion promoting layer was relatively thick compared to other embodiments, the transmittance of the flexible smart window was decreased, and the adhesion promoting layer and the polyimide film were partially damaged in the high temperature process.

In Comparative Example 2, since nitride was used without using the inorganic oxide having high heat resistance, the adhesive force was significantly decreased and the degree of damage to the polyimide film was increased compared to the examples.

Figure 8:
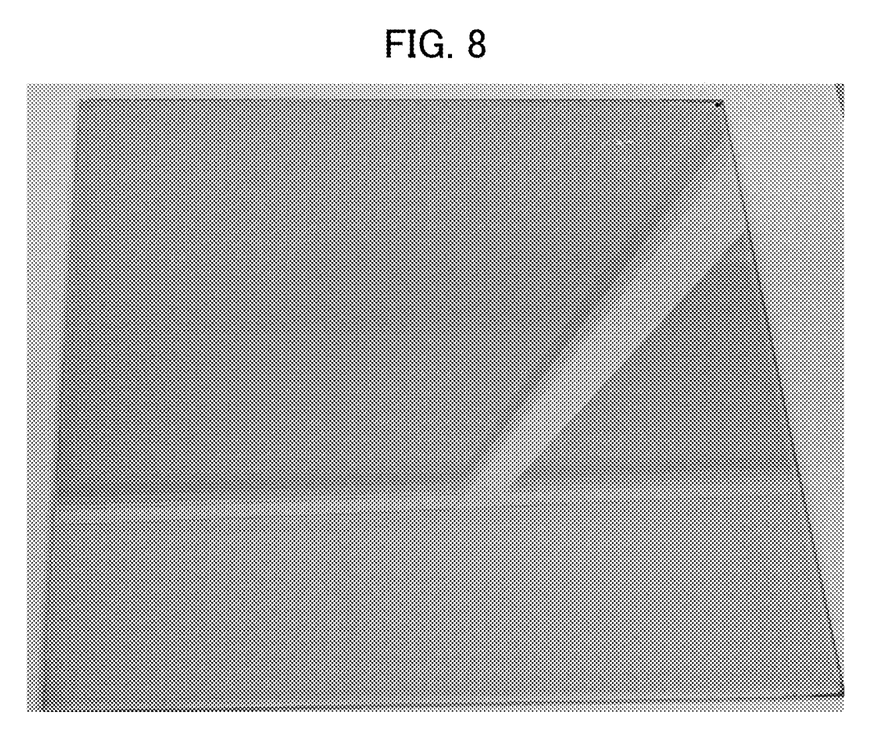
FIG. 8 is an image illustrating the film lifting evaluation result of the polyimide film of Example 1.
Figure 9:
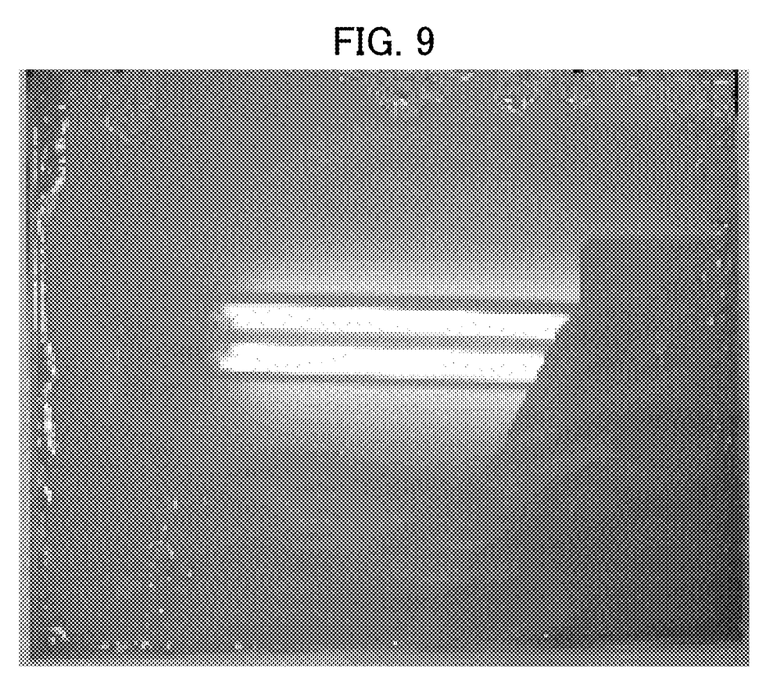
FIGS. 9 and 10 are images illustrating the film lifting evaluation results of the polyimide films of Comparative Examples 1 and 2, respectively.
Figure 10:
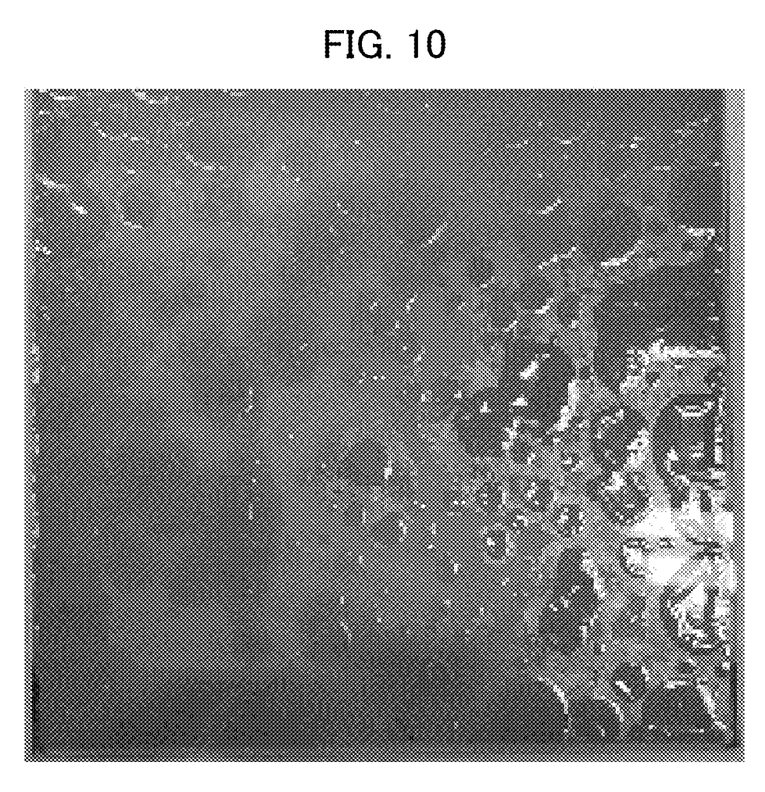

FIGS. 8 to 10 are images illustrating film lifting evaluation results of polyimide films formed according to the examples and comparative examples.

FIG. 8 is an image illustrating the film lifting evaluation result of the polyimide film of Example 1, and FIGS. 9 and 10 are images illustrating the film lifting evaluation results of the polyimide films of Comparative Examples 1 and 2.

Referring to FIGS. 8 to 10, the polyimide film of Example 1 was stably attached to the carrier substrate without lifting even after the high temperature process, but the polyimide films of Comparative Examples 1 and 2 were lifted and damaged.

What is claimed is:

1. A flexible smart window comprising:
   an electrochromic structure comprising a discoloration layer;
   a first polyimide film disposed on the electrochromic structure;
   a second polyimide film disposed under the electrochromic structure;
   a first adhesion promoting layer and a second adhesion promoting layer disposed on opposite surfaces of the first polyimide film, and
   a third adhesion promoting layer and a fourth adhesion promoting layer disposed on opposite surfaces of the second polyimide film,
   wherein the first, second, third and fourth adhesion promoting layer being vapor-deposited and comprising at least one selected from the group consisting of a metal oxide and a metalloid oxide.

2. The flexible smart window according to claim 1, wherein the metal oxide comprises at least one oxide selected from the group consisting of Al and Ti, and the metalloid oxide comprises an oxide of Si.

3. The flexible smart window according to claim 1, wherein the first adhesion promoting layer has a thickness of 30 nm to 70 nm.

4. The flexible smart window according to claim 1, wherein the electrochromic structure comprises a second conductive layer, an ion storage layer, an electrolyte layer, the discoloration layer, and a first conductive layer, which are sequentially disposed on the second polyimide film.

5. The flexible smart window according to claim 4, wherein the first conductive layer and the second conductive layer respectively comprise at least one conductive oxide selected from the group consisting of Indium Tin Oxide (ITO), Iridium Oxide (In$_2$O$_3$), Indium Gallium Oxide (IGO), Fluor-doped Tin Oxide (FTO), Aluminum-doped Zinc Oxide (AZO), Gallium-doped Zinc Oxide (GZO), Antimony-doped Tin Oxide (ATO), Indium-doped Zinc Oxide (IZO), Niobium-doped Titanium Oxide (NTO), Zink Oxide (ZnO) and Cesium Tungsten Oxide (CTO).

6. The flexible smart window according to claim 4, wherein the ion storage layer comprises an oxide or a hydroxide of at least one of Ni, Co and Mn.

7. The flexible smart window according to claim 4, wherein the electrolyte layer comprises at least one metal salt selected from the group consisting of metal salts of H$^+$, Li$^+$, Na$^+$, K$^+$, Rb$^+$ and Cs$^+$.

8. The flexible smart window according to claim 4, wherein the discoloration layer comprises at least one selected from the group consisting of an oxide, a hydroxide and Prussian blue
   wherein the oxide comprises at least one oxide selected from the group consisting of Ti, Nb, Mo, Ta, W, Cr, Mn, Fe, Co, Ni, Rh and Ir and the hydroxide comprises at least one hydroxide selected from the group consisting of Cr, Mn, Fe, Co, Ni, Rh and Ir.

9. The flexible smart window according to claim 1, wherein each of the first polyimide film and the second polyimide film has a glass transition temperature of 450° C. or higher.

10. The flexible smart window according to claim 1, further comprising a first protective film disposed on the first adhesion promoting layer, wherein the first adhesion promoting layer is disposed between the first polyimide film and the first protective film.

11. A method of manufacturing a flexible smart window comprising:
preparing a first multilayer structure by sequentially forming a first sacrificial layer, a first adhesion promoting layer, a first polyimide film, a second adhesion promoting layer, a first conductive layer, and a discoloration layer on a first carrier substrate;
preparing a second multilayer structure by sequentially forming a second sacrificial layer, a third adhesion promoting layer, a second polyimide film, a fourth adhesion promoting layer, a second conductive layer, and an ion storage layer on a second carrier substrate;
forming an electrolyte layer between the first multilayer structure and the second multilayer structure, and coupling the first multilayer structure and second multilayer structure so that the discoloration layer and the ion storage layer face each other; and
separating the first carrier substrate from the first multilayer structure and separating the second carrier substrate from the second multilayer structure.

12. The method of manufacturing a flexible smart window according to claim 11, wherein the separating of the first carrier substrate from the first multilayer structure and the separating of the second carrier substrate from the second multilayer structure comprises:
separating the first carrier substrate from the first multilayer structure after irradiating the first sacrificial layer with a laser light through the first carrier substrate; and
separating the second carrier substrate from the second multilayer structure after irradiating the second sacrificial layer with a laser light through the second carrier substrate.

13. The method of manufacturing a flexible smart window according to claim 11, wherein the forming the first sacrificial layer on the first carrier substrate and the forming the second sacrificial layer on the second carrier substrate comprise:
depositing silicon nitride (SiNx) and amorphous silicon on the first carrier substrate and the second carrier substrate, respectively; or
depositing gallium nitride (GaN) on the first carrier substrate and the second carrier substrate, respectively.

14. The method of manufacturing a flexible smart window according to claim 11, wherein the forming the first multilayer structure comprises forming the first polyimide film by applying a polyamic acid composition to the first adhesion promoting layer, followed by performing heat treatment at 450° C. to 500° C., and
the forming the second multilayer structure comprises forming the second polyimide film by applying a polyamic acid composition to the second sacrificial layer, followed by performing heat treatment at 450° C. to 500° C.

* * * * *